(12) United States Patent  (10) Patent No.: US 8,740,143 B2
Helfrich et al.  (45) Date of Patent: Jun. 3, 2014

(54) COMPARTMENT FOR ACCOMMODATING AT LEAST ONE FLIGHT CREWMEMBER

(75) Inventors: Felix Helfrich, Hamburg (DE); Thomas Sütthoff, Hamburg (DE)

(73) Assignee: Airbus Operations GmbH (DE)

( * ) Notice: Subject to any disclaimer, the term of this patent is extended or adjusted under 35 U.S.C. 154(b) by 642 days.

(21) Appl. No.: 12/530,886

(22) PCT Filed: Mar. 14, 2008

(86) PCT No.: PCT/EP2008/002069
§ 371 (c)(1),
(2), (4) Date: Jan. 6, 2010

(87) PCT Pub. No.: WO2008/110380
PCT Pub. Date: Sep. 18, 2008

(65) Prior Publication Data
US 2010/0140400 A1   Jun. 10, 2010

Related U.S. Application Data

(60) Provisional application No. 60/906,967, filed on Mar. 14, 2007.

(30) Foreign Application Priority Data

Mar. 14, 2007 (DE) .......................... 10 2007 012 376

(51) Int. Cl.
*B64D 11/00* (2006.01)

(52) U.S. Cl.
USPC ...................................... 244/118.5

(58) Field of Classification Search
USPC ...................... 244/118.5, 118.6; 105/314–316
See application file for complete search history.

(56) References Cited

U.S. PATENT DOCUMENTS

| 3,784,989 | A  | * | 1/1974 | LeGrand ............................ 5/9.1 |
| 6,182,926 | B1 | * | 2/2001 | Moore ....................... 244/118.5 |
| 2003/0006342 | A1 | | 1/2003 | Page |
| 2003/0029967 | A1 | | 2/2003 | Mills |
| 2005/0224646 | A1 | | 10/2005 | Mills |
| 2006/0000946 | A1 | | 1/2006 | Garofani et al. |
| 2006/0054741 | A1 | | 3/2006 | Mills et al. |
| 2006/0065783 | A1 | | 3/2006 | Mills |
| 2006/0284013 | A1 | | 12/2006 | Guering |
| 2007/0125909 | A1 | * | 6/2007 | Seiersen et al. ............ 244/118.5 |

FOREIGN PATENT DOCUMENTS

| DE | 29520433 U1 | 8/1996 |
| EP | 0850834 A1 | 7/1998 |
| EP | 0901962 A2 | 3/1999 |
| EP | 1010617 A2 | 6/2000 |

* cited by examiner

*Primary Examiner* — Timothy D Collins
*Assistant Examiner* — Brian M O'Hara
(74) *Attorney, Agent, or Firm* — Lerner, David, Littenberg, Krumholz & Mentlik, LLP

(57) ABSTRACT

An exemplary embodiment of the present invention provides a compartment for accommodating at least one flight crewmember, comprising a first module and a stowage area, wherein the first module comprises a first rest facility, wherein the first rest facility is arranged substantially perpendicular to the longitudinal axis of the aircraft, as well as substantially parallel to the traverse axis of the aircraft, and wherein the stowage area is substantially arranged under the first rest facility.

14 Claims, 7 Drawing Sheets

COMPARTMENT FOR ACCOMMODATING AT LEAST ONE FLIGHT CREWMEMBER

CROSS-REFERENCE TO RELATED APPLICATIONS

This application is a national phase entry under 35 U.S.C. §371 of International Application No. PCT/EP2008/002069, filed Mar. 14, 2008, published in English, which claims the benefit of the filing date of U.S. Provisional Patent Application No. 60/906,967 filed Mar. 14, 2007 and of German Patent Application No. 10 2007 012 376.2 filed Mar. 14, 2007, the disclosures of which are hereby incorporated herein by reference.

FIELD OF THE INVENTION

The present invention relates to rest compartments in aircraft. In particular, the present invention relates to a compartment for accommodating at least one flight crewmember, an aircraft with a corresponding compartment, as well as the use of a corresponding compartment in a means of transportation.

BACKGROUND OF THE INVENTION

Rest compartments for the flight crew of an aircraft (flight crew rest compartment FCRC) constitute part of the mandatory facilities on board aircraft during long flights. International standards require that a rest facility (e.g. a cot) for one person be provided for flights lasting from 8 to 14 hours, and that a rest facility for two persons be provided for flights lasting over 14 hours. This also stems from the requirement that two alternating cockpit crews must be on board starting at a specific flight duration. Given this fact, the compartment according to the present invention may be in use for a long period of time, or continuously for the duration of the flight.

Known FCRC's are realized with two adjacent rest facilities in the ceiling area, the crown area, of the aircraft. Usually, the cockpit crew has to cover a certain distance to reach the FCRC. The constricted rest area inside the compartment is followed by an overhanging area in the passenger cabin, e.g., the first class area, which may not have the full ceiling height in at least one section.

It is an object of the present invention to provide an improved compartment for accommodating at least one flight crewmember.

SUMMARY OF THE INVENTION

Disclosed is a compartment for accommodating at least one flight crewmember, an aircraft that comprises an according compartment, as well as the use of an according compartment in a means of transportation according to the independent claims.

According to an exemplary embodiment of the present invention a compartment for accommodating at least one flight crewmember is disclosed, comprising a first module, wherein the first module comprises a first rest facility and a stowage area. Among other ways, the space-saving arrangement is here achieved by way of a space-saving and modular configuration. The first rest facility may here be arranged substantially perpendicular to the longitudinal axis of the aircraft, as well as substantially parallel to the transverse axis of the aircraft. In addition, the stowage area may be situated substantially under the first rest facility or cot.

Therefore, the compartment according to the present invention is characterized by a cot lying substantially transverse to the longitudinal axis of the aircraft. Smaller or even larger deviations from the perpendicular orientation to the longitudinal axis are possible and permissible, as long as the core idea inherent to the present invention may be discerned herein. For example, situating the cot at an angle given tight space conditions may increase the available reclining surface without unnecessarily enlarging the compartment according to the present invention.

Another advantage to a cot being arranged transverse to the longitudinal axis of the aircraft is that an according configuration extends less invasively into the area of the aircraft lying behind it. This avoids optical, functional and technical difficulties relating to space during integration.

The configuration of the compartment according to a modular concept further permits the individual and/or short-term revision of the configuration, and hence significantly enhances flexibility. Given proper utilization, this results in a possible, even temporary, savings in weight, and hence a reduction in fuel consumption and pollutant emission.

In order to cover the steadily increasing need for stowage in an aircraft, the space under the first cot may substantially be arranged as a stowage area.

So, the compartment may be flexibly and individually tailored to changing circumstances or requirements, even for the short-term. In addition, the compartment according to the present invention satisfies expanded and/or future safety standards in civil aviation.

The following definitions are used within the context of this description:

Sitting facility: A seat is any arrangement that allows a person to assume a seated position. The seat may here be arranged as a dedicated seat, e.g., a specially and/or separately incorporated seat for flight personnel or a business class seat, or be integrated into a cot, for example.

Rest facility: A rest facility is any arrangement that allows a person to assume a reclined and sleeping position. While the cot may here be arranged as a simple foam support, anatomically correct elements and special structures are also conceivable to allow for a prolonged, comfortable period in the reclined position.

Compartment: A compartment is an substantially closed area or space that may be regarded as a logical and mechanical unit within the framework of an aircraft interior. The compartment may here have special or separate walls, or may alternatively be set up using existing walls of other compartments or areas, thereby sharing the wall functionality with this/these further compartment(s).

Further exemplary embodiments may be derived from the independent claims.

The following description specifies the present invention with reference a compartment for accommodating at least one flight crewmember. However, it is indicated that these exemplary embodiments also apply to both an aircraft that has a corresponding compartment, and to the use of an according compartment in a means of transportation.

According to an exemplary embodiment of the present invention, the first cot may be arranged substantially centrally relative to the height of the compartment.

Hence, a corresponding configuration allows for a much more flexible internal adjustment of the compartment layout. The first cot is here situated substantially directly over the stowage area, e.g., trolley parking space. This arrangement also maximizes the space available for the crewmember, and is what makes it possible to modify the interior further, thereby adapting it to different requirements.

According to another exemplary embodiment of the present invention, the first module may also comprise an entry area.

Integrating an entry area further increases the functionality of the compartment according to the present invention. For example, the entry area may be used as a changing cabin, preferably for crewmembers. An entry area, preferably at floor height or slightly elevated, also makes it much easier to reach the individual components of the compartment, since there is no need to directly enter and/or climb into it. A correspondingly expansive layout of an entry area makes for a more comfortable stay in the compartment according to the present invention.

According to another exemplary embodiment of the present invention, the first module may further comprise a first seat.

Integrating a seat may additionally enhance the comfort and flexibility of the compartment according to the present invention. Therefore, a crewmember situated in the compartment according to the present invention is not essentially forced to lie down; rather, he or she may freely decide on whatever position that suits their preference at the time in question. Hence, this also makes for a significantly more pleasant stay in the compartment. The comfort level is also elevated.

According to another exemplary embodiment of the present invention, the first seat may be a seat from the group consisting of a folding seat, aircraft seat, passenger seat, business class seat and high-comfort cabin attendant seat.

In order to enable as flexible an adjustment to reflect individual wishes on the one hand, while still being able, e.g. to offer maximum comfort on the other, the first seat may be realized in a different way. For example, a folding seat may be incorporated. The basic functional requirement here is the provision of a fully realized seat, but there are other advantages to the increased amount of space that may be made available by a folding seat with folded seating region or folded backrest and/or armrests, if furnished. Folded components may also assume other functions, e.g., provide additional support or stowage areas.

By contrast, if demand for comfort is high, the first seat according to the present invention may also be realized as a regular aircraft seat or passenger seat, wherein a seat with expanded comfort features may also be installed, such as a business class seat or a high-comfort cabin attendant seat. This may be associated with additional advantages, like a wider array of options for controlling mechanical and electronic components in the compartment, such as airflow, light, entertainment electronics, e.g., playing video, DVD on a corresponding screen, temperature, communication. A business class seat also makes it easy to integrate an additional supporting surface, such as a folding table stowed in the armrest or some other place. As a result, a separate table may not have to be integrated for the first seat in the compartment.

According to another exemplary embodiment of the present invention, the first cot may be arranged under the first seat in at least one partial region.

This directly provides for another savings on space. A corresponding embodiment may be facilitated in particular by the transverse first cot according to the present invention. In addition, optimal use may be made of the stowage space under the seat in the area of the seat frame structure for any regular aircraft seat aligned in the longitudinal direction of the aircraft, regardless of the class in which used. Further, an according embodiment may provide for a compact, space and resource-saving realization.

According to another exemplary embodiment of the present invention, the first module may further comprise a stowage pocket and at least one folding table. The stowage pocket may here additionally be arranged as a step.

This embodiment, e.g., just as the aforementioned entry area, may be combined with this entry area to specially, but not exclusively, enable an expanded and especially comfortable interior segmentation of the compartment according to the present invention. For example, the step realized via the stowage pocket may be used to reach the first cot in an easy, readily accessible manner. This obviates and even effectively precludes a strenuous climbing maneuver by a flight crewmember that may be hazardous with the aircraft in flight to reach the first cot. The functionality of the compartment is further increased especially when combined with the function as an additional stowage pocket, e.g., to provide an ideal stowage area to hold rarely needed items in the aircraft, or for use as an individual stowage area for the flight crewmember(s). In addition, at least one folding table may be provided, offering the reclining or seated persons in the compartment a supporting surface sufficient for accommodating meals, drinks or the like, such as books, small electronic devices, etc. A folding table may here be used in a flexible and space-saving manner only when the actual need exists for it.

According to another exemplary embodiment of the present invention, the first cot may be arranged as a second seat in at least one partial area.

Part of the cot may be specially adapted for simultaneous use as a second seat. This special shape may be incorporated into a possible support, or the cot itself may be correspondingly arranged. It may also be that no special shape is provided at all. When using the second cot, the stowage pocket may act not just as a step, but also a foot support. Depending on comfort requirements, it may also be possible to design the step in such a way as not to be a foot support. Further, the at least one folding table may be specially equipped to satisfy the needs of a person occupying the second seat.

According to another exemplary embodiment of the present invention, a second module may be provided, comprising a second cot, wherein the second cot is arranged substantially perpendicular to the first cot, and wherein the second module is arranged in the ceiling area of the aircraft cabin.

Expanding the compartment with an additional second module, and hence a second cot, makes it possible to further expand the area of application. For example, the number of required cots for the cockpit crew of an aircraft depends on the flight duration underlying the respective flight. International standards require no cot for flights lasting under 8 hours, one cot for flights lasting 8 to 14 hours, and two cots for flights lasting over 14 hours. A second cot arranged perpendicular to the first cot also provides an expanded private space while allowing simultaneous use and occupation of both cots. This effect is enhanced by arranging the second cot in the ceiling area, and hence at a different height relative to the first cot. The single cot in the ceiling area may also be optically and spatially arranged to extend into the cabin much less invasively.

According to another exemplary embodiment of the present invention, the connection between the first module and second module may be arranged as a non-permanent connection.

This allows to adjust compartment segmentation or aircraft equipment to individual circumstances, even on a short term basis, if required. Therefore, it may be possible to honor individual preferences of the respective airline during the aircraft assembly phase without having to set aside two basic components for the compartment according to the present invention for this purpose during production. The first module is here essentially installed in the aircraft as the base module, if required expanded by the second module. As a further alternative, the airline company may be given the option of short-term retrofitting, e.g., between landing and the next flight in a very short time, depending on the flight route. In this way, for example, the second module may be installed in the aircraft within the shortest time possible, and set up temporarily for flight times exceeding 14 hours as a result. As a consequence, an unnecessary second cot need not be included on board permanently, while still allowing a flexible response to airline requirements.

However, it is also possible to not provide an installable second module at all. The base module, or first module, is here identical to the preceding case. This may be expedient for airlines that do not service flight routes exceeding 14 hours, or do not intend to use this specific aircraft for these purposes. A recess for connecting module 2 may here be sealed with a special protective cover, or the first module is directly covered by an alternative, continuous rear wall during installation. In this case, a potentially special configuration for the ceiling structure of the aircraft may not be necessary; rather, the resultant extra space may be further individualized, so that structural units may be incorporated into the aircraft that may not be realized with a corresponding, potentially permanently installed compartment structure.

According to another exemplary embodiment of the present invention, the first module may be arranged to substantially directly adjoin the cockpit.

A corresponding embodiment allows for a further reduction of space required. The compartment used substantially for the cockpit crew edges spatially closer to the cockpit. This allows to minimize distances covered and the time required to do so, and a second module set up in the ceiling area extends into the aircraft cabin toward the passengers to far less an extent. This in turn results in less optical and spatial intrusion. As a result, the space in the entry area of the front aircraft doors directly adjacent to the cockpit, the door 1 area, may also be better used more individually and generously for other structural measures. It may be conceivable to incorporate a large galley area or even a bar, for example.

According to another exemplary embodiment of the present invention, the compartment may be arranged in such a way as to permit the attachment of a door element, the door element separating the cockpit and the compartment area from the passenger area.

This further enhances the privacy of the cockpit crew, among other things. An enclosed area created between the cockpit and door element in this way may be used as an additional rest area or a changing area.

According to another exemplary embodiment of the present invention, the door element may be arranged as a security door (privacy door module).

This embodiment provides improved security for the cockpit crew, not necessarily just in the case of in-flight terrorist activities. Another, potentially monitored door may [verb missing in German] the cockpit intrusion time, or even prevent or at least greatly impede surprise attack on the cockpit and its crew. This also makes it possible to keep the cockpit doors meant to satisfy specific security requirements open more liberally during brief usage of the compartment according to the present invention, so as to improve the workflow of the cockpit crew in this way.

According to another exemplary embodiment of the present invention, at least of the first cots, the second cots, the first seat and the second seat may be arranged anatomically advantageous.

As a result, the comfort may be significantly increased for a respective crewmember who just happens to be using the compartment according to the present invention at the time. A special support of the cot may here already have an anatomically advantageous design, or the individual modules may have special moldings and/or bulges, for example, to satisfy an elevated space requirement at pivotal, localized spots. For example, the shoulder/arm area of the cot may be wider than the accompanying leg area.

According to another exemplary embodiment of the present invention, the wall transitions between a first module and passenger area as well as a second module and passenger area may satisfy at least one security requirement out of the group consisting of prevention of access, prevention of entry and prevention of penetration and sufficing the security requirements of the cockpit crew.

This allows to expand the cockpit area by the compartment according to the present invention. In particular when using a special door module of the kind also used for cockpit doors as well as special structural measures relating to the separation wall, the cockpit crew may be provided with a significantly enlarged security zone, in which the individual members may move about freely. This exemplary embodiment is also advantageous with respect to any future development in which the cockpit crew and passenger area are completely separated from each other to prevent or at least hamper incursions and/or terrorist activities. By simultaneously enlarging the area available to the cockpit crew, this hence makes it possible to comply with such a requirement while optimizing the mental and physical stress factors.

According to another exemplary embodiment of the present invention, the stowage area may also be arranged on the outer wall of the module facing the passenger area.

This type of arrangement greatly simplifies the internal segmentation of the compartment. In addition, the stowage area may be preferably accessed from the passenger area as a result. This allows for a simple, quick and direct access to the stowage area. Access form the passenger area side is also made easier due to the more generous space conditions prevalent in this area.

According to another exemplary embodiment of the present invention, the stowage area may be arranged as at least one trolley parking space.

Given the correct implementation, the first cot may be arranged in such a way as to provide at least one trolley parking space on the exterior side. Since the compartment according to the present invention is substantially arranged in the area of the front galley, this maintains the necessary stowage space for trolleys. Such an embodiment may allow the continued stowage of the usual number of trolleys at the same location. This may avoid further reaching measures for reconfiguring the galley structures or equipment.

According to another exemplary embodiment of the present invention, the outer wall of the first module facing the passenger area may include an angle with the aircraft longitudinal axis that differs from 90° in at least one partial area.

This type of angled design for the rear wall of the first module using outwardly inclined wall areas allows to increase the level of comfort inside the compartment according to the present invention without at the same time having to make extensive changes in the cabin configuration. A corresponding angle makes it possible to arrange the first seat in a more comfortable or better way, for example, since the backrest may be arranged at an angle that is preferred from an ergonomic standpoint, for example. The side need here not be angled over its entire surface, rather, a perpendicular wall area near the floor and an angled wall area near the ceiling is conceivable, for example.

According to another exemplary embodiment of the present invention, the area between the door element and cockpit may be arranged as a changing area.

The spatially more generous layout in conjunction with the security aspects addressed above makes allows to arrange the area between the door element and cockpit to not be visible from the passenger area. As a result, the private area created as a result may find varying applications, e.g., as a changing area.

According to another exemplary embodiment of the present invention, the first seat may be arranged as a TTL-certified seat (taxi, takeoff and landing).

Especially their arrangement in the flight direction in conjunction with a specially arranged seat allows to certify the first seat as a TTL seat. Consequently, a comparable seat for flight personnel in the passenger area may be omitted, yielding an enhanced design freedom and potential savings on weight.

According to another exemplary embodiment of the present invention an aircraft that has a corresponding compartment is disclosed.

Further, according to another exemplary embodiment of the present invention the use of a corresponding compartment in an aircraft is disclosed.

Further exemplary embodiments and advantages of the present invention may be gleaned from the following description of figures.

Preferred exemplary embodiments of the present invention will be described below, drawing reference to the figures.

DETAILED DESCRIPTION OF EXEMPLARY EMBODIMENTS

The following description of figures utilizes the same reference numbers for the same or similar elements.

The present invention will be described below using several preferred configurations of the compartment according to the present invention. However, the embodiments arrived at here also relate to an aircraft that has a corresponding compartment, as well as the use of a corresponding compartment in a means of transportation.

Figure 1:
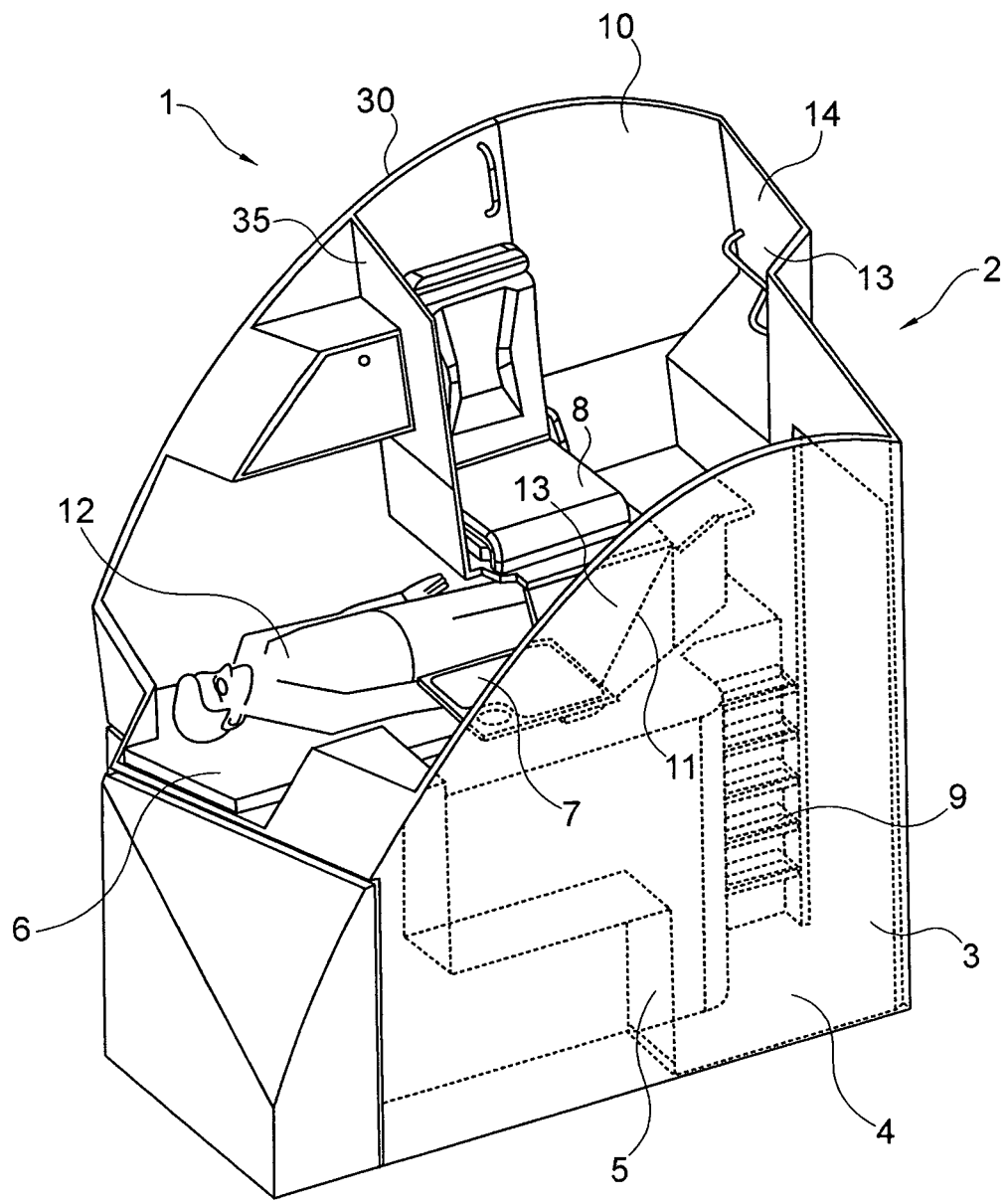
FIG. 1 is a schematic, three-dimensional view of the first module of the compartment according to an exemplary embodiment of the present invention.

FIG. 1 here shows a schematic, three-dimensional view of the first module (2) of the compartment (1) according to the present invention. A door opening (3) is used to step into the entry area (4). The first cot (6) may be reached via the stowage pocket (5), which may also be used as a step. The first cot (6) is here arranged at the half of the compartment height. The folding table (7) is shown folded out, but may be folded up to get to the first cot (6). The first seat (8) may in turn be reached via the stowage pocket (5), or by way of a vertical ladder (9). While FIG. 1 shows the first seat (8) as an aircraft seat, another realization is also conceivable, as described above. Situated in the area near the first seat (8) and over the vertical ladder (9) is a rear wall (30) with a screen panel (10), which is used in the case of an uninstalled second module (15). A continuous rear wall (30) is also conceivable if no second module (15) is to be attached. The first cot (6) lies in a partial area (11) under the first seat (8) to free up enough room for the legs/feet of the first crewmember (12) lying on the first cot (6). Both the partial area (11) and a bulge (14) are here designed/arranged in an ergonomically advantageous (13) manner.

Figure 2:
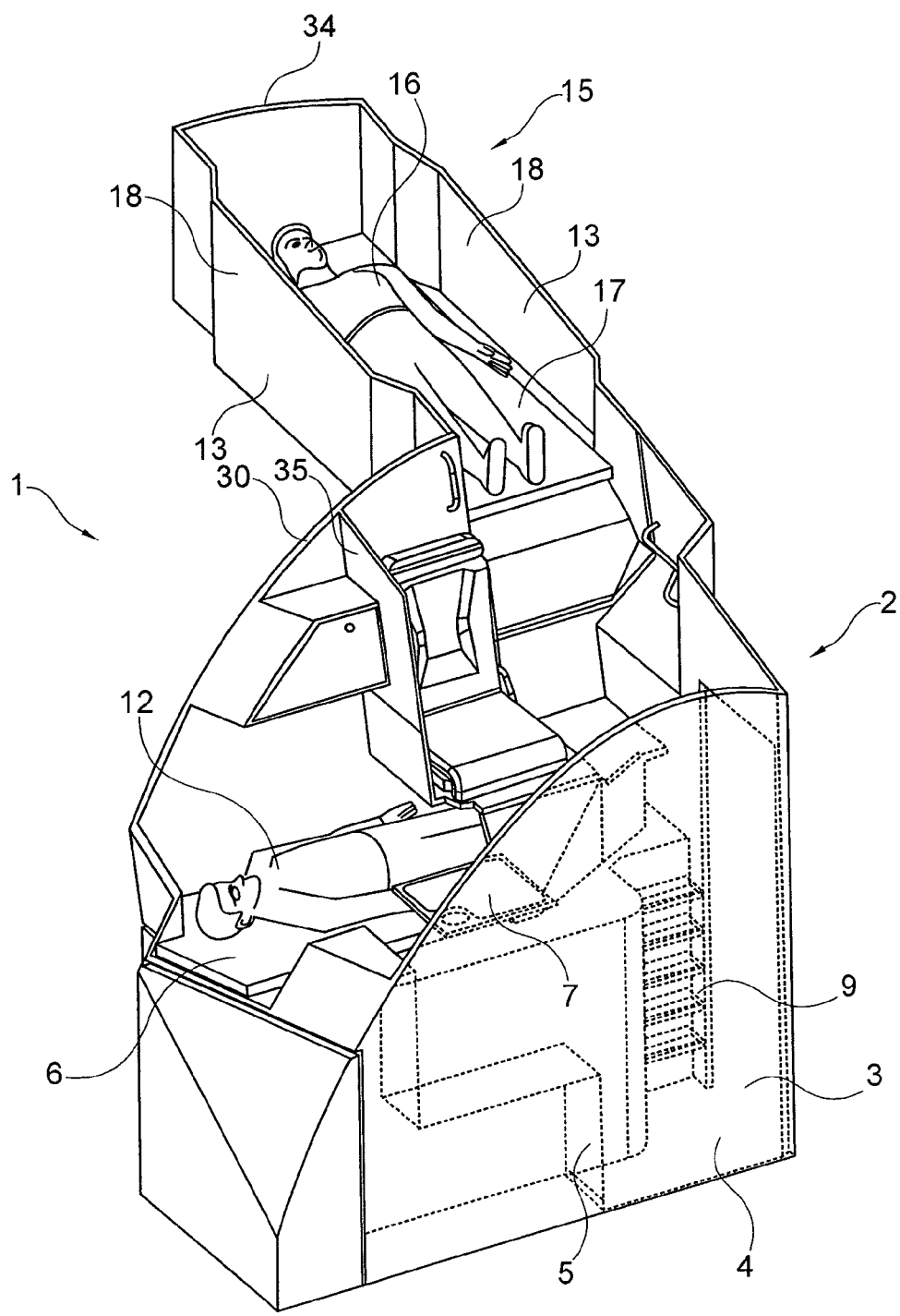
FIG. 2 is a schematic, three-dimensional view of the first module, expanded by the second module, of the compartment according to an exemplary embodiment of the present invention.

FIG. 2 shows a schematic, three-dimensional view of the first module (2), expanded by the second module (15), of the compartment (1) according to the present invention. The screen panel (10) next to the first seat (8) is no longer present here; rather, the second module (15) is set up in this location. A second crewmember (16) lies on the second cot (17) in the second module (15). The lateral walls (18) of the second module (15) here have the same ergonomically advantageous (13) design.

Entry into the second module (15) is gained via the vertical ladder (9), which may also be replaced by steps.

Figure 3:
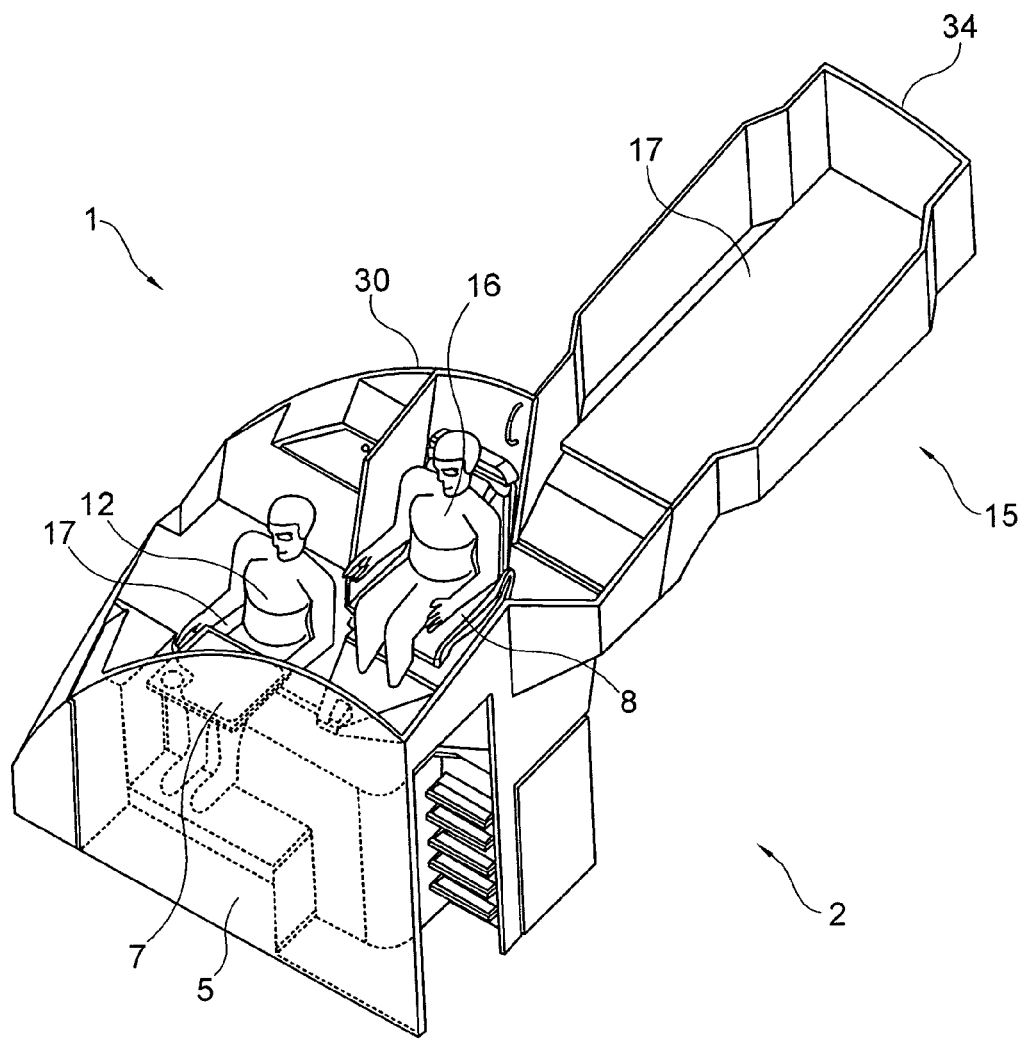
FIG. 3 is another schematic, three-dimensional view of the compartment according to the present with a first module and a second module according to an exemplary embodiment of the present invention.

FIG. 3 shows another schematic, three-dimensional view of the compartment (1) according to the present invention with a first module (2) and a second module (15). Both crewmembers (12, 16) are in the seated position. The first crewmember (12) here sits on the second seat (17), which is integrated into the first cot (6). The folding table (7) is folded out, and allows the first crewmember (12) for example, to eat or it may be used as a supporting surface. The stowage pocket (5) is here used as a foot support. In this case, the second crewmember (16) uses the first seat (8), which is arranged as a standard seat. The corresponding seated position of the second crewmember (16) shown here may also be assumed during the takeoff and landing phase given a TTL-certified first seat (8). When the compartment (1) is used for two seated persons, a lateral screen is provided next to the first seat (8) so as to enhance the private sphere of the individual persons.

Figure 4:
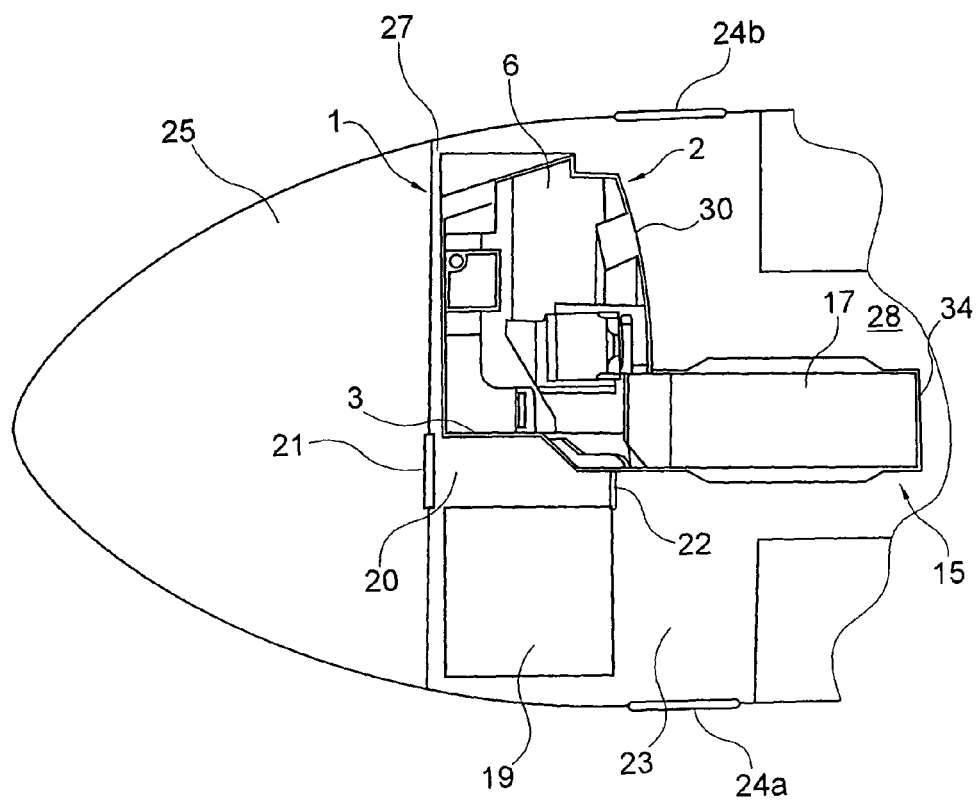
FIG. 4 is a schematic, two-dimensional horizontal sectional view through the fuselage according to an exemplary embodiment of the present invention.

FIG. 4 shows a schematic, two-dimensional horizontal sectional view through the fuselage according to an exemplary embodiment of the present invention. The first module (2) and second module (15) substantially adjoin the cockpit wall (27) directly as a compartment (1), and are arranged behind the cockpit (25). Located opposite the door opening (3) is a monument (19), such as a toilette. The doors of the monument (19) may here be aligned relative to the passenger space and intermediate area (20), respectively. The intermediate area (20), which may also be used as a changing area, for example, is bordered by the first module (2), monument (19), cockpit door (21) and door element (22). Arranged directly behind the compartment according to the present invention is the door 1 area (23) with the aircraft doors (24a, 24b).

Figure 5:
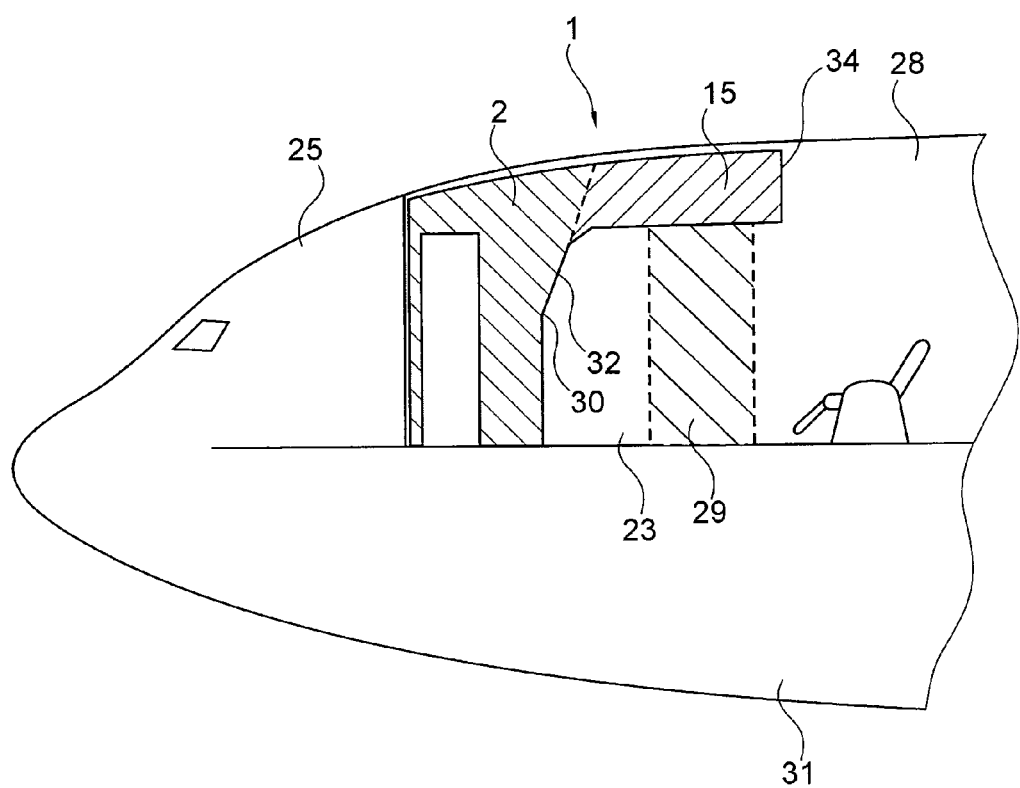
FIG. 5 is a schematic, two-dimensional vertical sectional view through the fuselage according to an exemplary embodiment of the present invention.

FIG. 5 shows a schematic, two-dimensional vertical sectional view through the fuselage according to an exemplary embodiment of the present invention. The first module (2) and second module (15) are here shown directly adjoining the cockpit (25). The door 1 area (23) is directly adjacent. The further incorporation of a galley or even a bar (29) is indicated. This is followed directly by the beginning of the passenger area (28), here the first-class cabin is shown schematically. As evident, the rearward facing wall (34) of the second module (15) only extends insignificantly into the first-class cabin of the passenger area (28), if at all. Situated under the structure is the cargo hold (31). The rear wall (30) of the first module (2) is not perpendicular throughout, but rather angled in at least one partial area (32).

Figure 6:
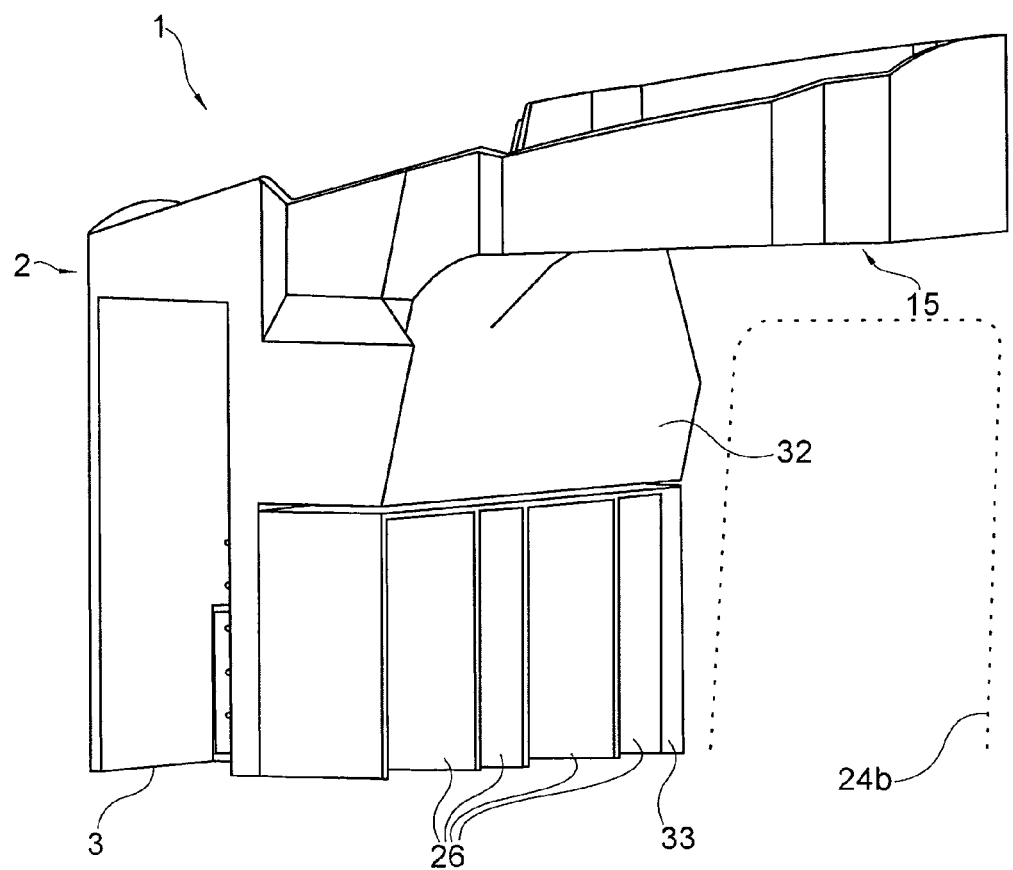
FIG. 6 is a schematic, three-dimensional view of the compartment according to the present invention from outside toward the door 1 area according to an exemplary embodiment of the present invention
Figure 7:
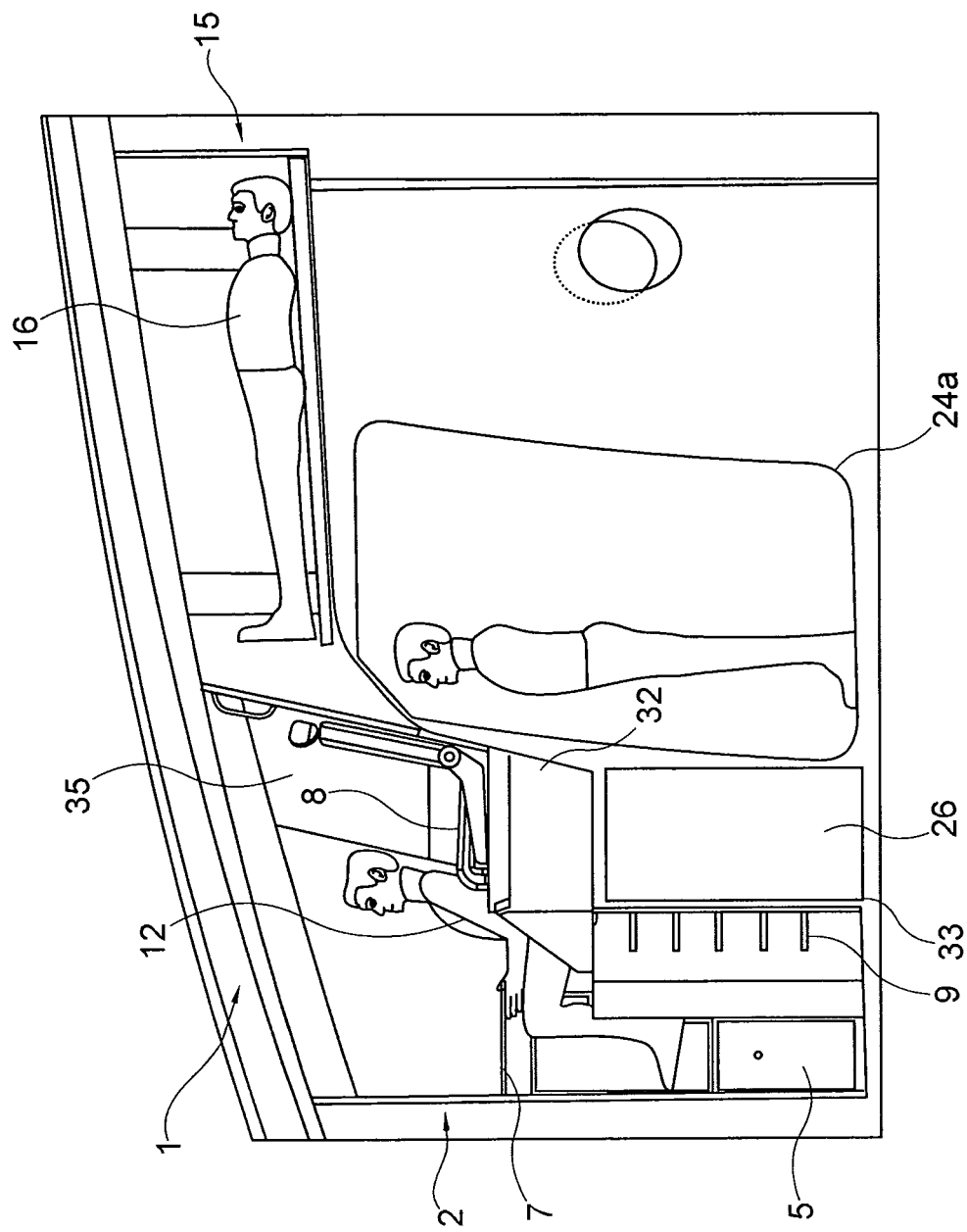
FIG. 7 is a magnified, two-dimensional vertical sectional view through the fuselage according to an exemplary embodiment of the present invention.

FIGS. 6 and 7 show a schematic, three- or two-dimensional view of the compartment (1) according to the present invention from outside toward the door 1 area (23), as well as a side view of the compartment (1). Situated under the first module (2) is the at least one trolley parking space (26), here shown as a parking space for 6 trolleys in all. Any other kind of segmentation is conceivable, and the corresponding trolley stowage areas (33) are provided to the respective airline upon request. The trolley stowage area (33) in FIG. 6 is shown as a separate unit, which is independent of the first module (2), and upon which the first module (2) is placed. However, realizing the first module (2) with integrated trolley stowage area (33) is also conceivable. The stowage area (26) is located under the first cot (6). The rear wall (30) of the first module (2) extends into the passenger area (28), slightly inclined.

It must additionally be noted that "having" or "comprising" does not preclude other elements or steps, and that "a" or "an" does not preclude a plurality. Further, let it be noted that features of steps described with reference to one of the above exemplary embodiments may also be used in combination with other features or steps from other exemplary embodiments described above. Reference numbers in the claims are not to be considered limiting.

REFERENCE LIST

1 Compartment
2 First module
3 Door opening
4 Entry area
5 Stowage pocket
6 First cot
7 Folding table
8 First seat
9 Vertical ladder
10 Screen panel
11 Partial area of the first cot
12 First crewmember
13 Ergonomically advantageous configuration
14 Bulge
15 Second module
16 Second crewmember
17 Second cot
18 Lateral walls
19 Monument
20 Intermediate area
21 cockpit door element
22 Door element
23 Door 1 area
24a,b Aircraft doors
25 Cockpit
26 Trolley parking space
27 Cockpit wall
28 Passenger area
29 Galley or bar
30 Rearward facing wall of the first module
31 Cargo hold
32 Partial area of the rearward facing wall of the first module
33 Trolley stowage area
34 Rearward facing wall of the second module
35 Screening wall

The invention claimed is:

1. A flight crew rest compartment (FCRC) for accommodating at least two flight crewmembers, the compartment forming a substantially closed area and comprising:
a first FCRC module configured as a base module in an aircraft cabin, wherein the first FCRC module comprises
a first cot arranged substantially centrally relative to the height of the compartment; and
a stowage area;
a second FCRC module comprising a second cot configured to be arranged in a ceiling area of an aircraft cabin at a different height relative to the first cot,
wherein the second cot is arranged substantially perpendicular to the first cot;
wherein the stowage area is arranged substantially under the first cot;
wherein a connection between the first FCRC module and the second FCRC module is arranged as a non-permanent connection, wherein the second FCRC module can be selectively uninstalled;
wherein, in a first configuration, the second FCRC module is uninstalled and the first FCRC module is sealed by a screen panel or a wall; and
wherein, in a second configuration, the second FCRC module is connected to the first FCRC module at said different height and the screen panel or wall is removed.

2. The compartment according to claim 1, wherein the first FCRC module further comprises an entry area.

3. The compartment according to claim 1, wherein the first FCRC module further comprises a first sitting facility.

4. The compartment according to claim 3, wherein the first sitting facility is selected from the group consisting of a folding seat, aircraft seat, passenger seat, business-class seat and high-comfort cabin attendant seat.

5. The compartment according to claim 3, wherein the first cot is arranged under the first seat in at least one partial region.

6. The compartment according to claim 3, wherein the first sitting facility is a TTL-certifiable seat.

7. The compartment according to claim 1, wherein the stowage area is arranged as a step, and wherein the compartment further comprises at least one folding table.

8. An aircraft comprising a flight crew rest compartment (FCRC) for accommodating at least two flight crewmembers, the compartment forming a substantially closed area and comprising:
a first FCRC module configured as a base module in an aircraft cabin, wherein the first module comprises
a first cot, wherein the first cot is arranged substantially centrally relative to the height of the compartment; and
a stowage area;
a second FCRC module comprising a second cot configured to be arranged in a ceiling area of an aircraft cabin at a different height relative to the first cot,
wherein the second cot is arranged substantially perpendicular to the first cot;
wherein the stowage area is arranged substantially under the first cot;

wherein a connection between the first FCRC module and the second FCRC module is arranged as a non-permanent connection, wherein the second FCRC module can be selectively uninstalled;

wherein, in a first configuration, the second FCRC module is uninstalled and the first FCRC module is sealed by a screen panel or a wall;

wherein, in a second configuration, the second FCRC module is connected to the first FCRC module at said different height and the screen panel or wall is removed; and wherein the first module is arranged in such a way as to substantially directly adjoin a cockpit of the aircraft.

9. The aircraft according to claim 8, wherein the compartment is arranged in such a way as to allow the attachment of a door element, the door element separating a cockpit and a compartment area of the aircraft from a passenger area of the aircraft.

10. The aircraft according to claim 9,
wherein the door element is arranged as a security door.

11. The aircraft according to claim 9, further comprising a wall transition between the first module and a passenger area as well as the second module and the passenger area satisfying at least one security requirement selected from the group consisting of prevention of access, prevention of entry and prevention of penetration and sufficing security requirements of the cockpit crew.

12. The aircraft according to claim 9, wherein the area between the door element and cockpit is a changing area.

13. The aircraft according to claim 8, wherein the stowage area is arranged on an outer wall of the module facing the passenger area.

14. The aircraft according to claim 8, wherein the stowage area is adapted as at least one trolley parking space.

* * * * *